(12) United States Patent
Su

(10) Patent No.: US 11,957,988 B2
(45) Date of Patent: Apr. 16, 2024

(54) SMART CENTER SHAFT, SMART RUBIK'S CUBE, AND TIMING METHOD THERFOR

(71) Applicant: FS GIIKER TECHNOLOGY CO., LTD., Guangdong (CN)

(72) Inventor: Ziming Su, Foshan (CN)

(73) Assignee: FS GIIKER TECHNOLOGY CO., LTD., Foshan (CN)

(*) Notice: Subject to any disclaimer, the term of this patent is extended or adjusted under 35 U.S.C. 154(b) by 341 days.

(21) Appl. No.: 17/423,558

(22) PCT Filed: Jan. 15, 2020

(86) PCT No.: PCT/CN2020/072284
§ 371 (c)(1),
(2) Date: Jul. 16, 2021

(87) PCT Pub. No.: WO2020/147757
PCT Pub. Date: Jul. 23, 2020

(65) Prior Publication Data
US 2022/0080297 A1 Mar. 17, 2022

(30) Foreign Application Priority Data

Jan. 18, 2019 (CN) .......................... 201910108286.8
Jul. 25, 2019 (CN) .......................... 201910676384.1

(51) Int. Cl.
*A63F 9/08* (2006.01)
*G06F 1/3212* (2019.01)

(52) U.S. Cl.
CPC .......... *A63F 9/0826* (2013.01); *A63F 9/0838* (2013.01); *A63F 9/0842* (2013.01);
(Continued)

(58) Field of Classification Search
None
See application file for complete search history.

(56) References Cited

U.S. PATENT DOCUMENTS 11,559,734 B2 * 1/2023 Jiang ...................... A63F 9/0612
2019/0184275 A1 * 6/2019 Su .......................... A63F 9/0834
(Continued)

FOREIGN PATENT DOCUMENTS

| CN | 106110651 B | 11/2017 |
| CN | 108525283 A | 9/2018 |

(Continued)

OTHER PUBLICATIONS

Patent Cooperation Treaty: International Search Report and Written Opinion for PCT/CN2020/072284; dated Mar. 18, 2020; 6 pages.

*Primary Examiner* — Sunit Pandya

(57) ABSTRACT

A smart center shaft, a smart Rubik's Cube, and a timing method therefor. The smart center shaft comprises a core, a sensor, and a master control module. The core comprises a housing having a cavity. The sensor is mounted on the core. The sensor comprises a stator and a rotor. The stator is fixed on the housing. The rotor is configured to be connected and rotate simultaneously with a Rubik's Cube layer of the smart Rubik's Cube, thus allowing the rotor to rotate with the Rubik's Cube layer relative to the stator. The master control module is mounted within the cavity. The master control module is electrically connected to the sensor. The master control module acquires a rotation signal of the Rubik's Cube layer on the basis of the relative rotation between the rotor and the stator. The sensor and the core form one integral body, the degree of integration is high, and the consideration of complex assembly relations between the stator and a center block or an intermediate connecting block is avoided.

11 Claims, 9 Drawing Sheets

(52) U.S. Cl.
CPC .... *G06F 1/3212* (2013.01); *A63F 2250/1063* (2013.01); *A63F 2250/1073* (2013.01)

(56) References Cited

U.S. PATENT DOCUMENTS

| | | | |
|---|---|---|---|
| 2022/0072414 A1* | 3/2022 | Su | G06F 1/3212 |
| 2022/0339530 A1* | 10/2022 | Su | A63F 9/0842 |

FOREIGN PATENT DOCUMENTS

| | | | |
|---|---|---|---|
| CN | 109675297 A | 4/2019 | |
| CN | 110368670 A | 10/2019 | |
| CN | 107670268 B | 3/2020 | |
| WO | 2018138586 A3 | 9/2018 | |

* cited by examiner

SMART CENTER SHAFT, SMART RUBIK'S CUBE, AND TIMING METHOD THERFOR

CROSS-REFERENCE TO RELATED APPLICATIONS

This application is a U.S. National Phase application submitted under 35 U.S.C. § 371 of Patent Cooperation Treaty application serial no. PCT/CN2020/072284, filed Jan. 15, 2020, and entitled SMART CENTER SHAFT, SMART RUBIK'S CUBE, AND TIMING METHOD THEREFOR, which application claims priority to Chinese patent application serial no. 201910108286.8, filed Jan. 18, 2019, and Chinese patent application serial no. CN 201910676384.1, filed Jul. 25, 2019.

Patent Cooperation Treaty application serial no. PCT/CN2020/072284, published as WO 2020/147757 A1, and Chinese patent application serial nos. 201910108286.8 and 201910676384.1 are incorporated herein by reference.

TECHNICAL FIELD

The present disclosure relates to a field of smart magic cubes, and in particular, to a smart center shaft, a smart magic cube and a timing method thereof.

BACKGROUND

A smart magic cube is a new type of electronic magic cube that senses the status and rotation position of the magic cube in real time through sensors, and processes, stores and sends information, such as the real-time status, rotation, and the like, to external devices. However, the conventional smart magic cube has a problem of low intelligence of its center shaft.

SUMMARY

Accordingly, it is necessary to provide a smart center shaft, a smart magic cube and a timing method thereof, to address the problem of low intelligence of the magic cube's center shaft. The smart center shaft can learn rotation signals of cube layers, and then obtain the status signal of the smart magic cube, which is highly intelligent.

A smart center shaft includes a core, a sensor, and a main control module. The core includes a housing with a cavity. The sensor is mounted on the core. The sensor includes a stator and a rotor. The stator is fixed to the housing. The rotor is configured to be able to be connected to and synchronously rotated with a cube layer of the smart magic cube, so that the rotor is capable of being rotated relative to the stator following the cube layer. The main control module is mounted in the cavity. The main control module is electrically connected to the sensor. The main control module obtains a rotation signal of the cube layer according to a relative rotation between the rotor and the stator.

In the above smart center shaft, the stator is fixed to the housing, and the sensor and the core form a whole, which is highly integrated, and avoids considering a complicated assembly relationship between the stator and a central block or an intermediate connecting block. The main control module obtains a rotation signal of the cube layer according to the relative rotation between the rotor and the stator, and then obtains a status signal of the smart magic cube according to the rotation signal of each cube layer. Therefore, the smart center shaft is highly intelligent. When the smart center shaft is assembled with the cube blocks, the smart magic cube can realize an online magic cube competition.

In one embodiment, the smart center shaft further includes a connecting rod, on which a center block or an intermediate connecting block is mounted. The rotor is rotatably mounted on the housing. The connecting rod is fixedly connected to the rotor. The center block or the intermediate connecting block is fixedly mounted on the connecting rod, so that the connecting rod is synchronously rotated as the cube layer is rotated. Therefore, when the connecting rod is connected to the rotor, the rotor can be synchronously rotated with the cube layer.

In one embodiment, the sensor is located in the housing. The housing is provided with a through hole. The connecting rod is connected to the rotor after passing through the through hole. The sensor is entirely located in the housing, which is beneficial to the protection of the sensor and prevents the sensor from being impacted or interfered by the cube block or other structural components when the magic cube is rotated. In addition, the sensor and the core form a tighter whole. The smart center shaft has a higher degree of integration and is easier to be compatible and assembled with the cube block.

In one embodiment, the sensor further includes a first mounting block fixedly mounted on the housing and a second mounting block rotatably mounted on the housing. The stator is fixed to the first mounting block, and the rotor is fixed to the second mounting block. A receiving cavity is formed between the first mounting block and the second mounting block. The stator and the rotor are located in the receiving cavity, which facilitates a good rotational fit between the stator and the rotor. Furthermore, the design of the receiving cavity can avoid the interference of the main control module and other components inside the housing to the sensor, in order to accurately obtain the rotation signal of the cube layer.

In one embodiment, the sensor further includes a connecting housing rotatably mounted on the housing. The connecting housing is configured to be capable of being fixedly connected to a central block or an intermediate connecting block. The rotor is fixed to the connecting housing. The central block or the intermediate connecting block can be rotated synchronously with the cube layer, so that the connecting housing and the rotor realize a synchronous rotation with the cube layer.

In one embodiment, the rotor is fixed on an inner side of the connecting housing. The stator is fixed on an outer surface of the housing. The connecting housing covers the rotor. Therefore, the connecting housing can protect the rotor and the stator at the same time and enable the entire sensor to be independent of others, so as to prevent the sensor from being interfered by the environment or other components, especially in the smart magic cube with small internal space, many components, and the components constantly rotating during use.

In one embodiment, a peripheral edge of the connecting housing is provided with a rotating flange. The outer surface of the housing is provided with a protrusion. The protrusion is provided with a sliding groove that cooperates with the rotating flange. Therefore, during the rotation of the connecting housing and the rotor, the sliding groove can limit the connecting housing, which can ensure a smooth rotation of the connecting housing and the rotor.

In one embodiment, the main control module includes a processing unit, a control unit, and a communication unit. The processing unit is configured to convert the rotation signal of the cube layer to a status signal of the smart magic cube. The control unit is electrically connected to the processing unit and the communication unit, respectively. The communication unit is configured for data transmission between the control unit and peripheral devices.

In one embodiment, the stator includes a common signal ring and an angle signal ring that is coaxial with and insulated from the common signal ring. The rotor is a conductive member. The conductive member includes a first contact pin and a second contact pin. The first electric contact pin is configured to be in contact with the common signal ring. The second electric contact pin is used to be in contact with different positions of the angle signal ring when the cube layer is rotated.

A smart magic cube includes a plurality of cube blocks and the smart center shaft as described above. The plurality of cube blocks is mounted on the smart center shaft. The plurality of cube blocks forms a plurality of cube layers. The rotor is connected to the cube layers.

The smart magic cube can obtain the status signal of the smart magic cube by means of the main control module, which can realize intelligence, and can realize the online magic cube competitions.

In one embodiment, the smart magic cube is a second-order magic cube, a third-order magic cube, or a high-order magic cube.

A smart magic cube includes a plurality of cube blocks and the smart center shaft as described above. The plurality of cube blocks is mounted on the smart central shaft. The plurality of cube blocks forms a plurality of cube layers. The rotor is connected to the cube layers. The smart magic cube further includes an elastic member. The smart central shaft further includes a plurality of connecting rods distributed on the core at intervals. The connecting rods are adjusting screws. The adjusting screw is connected to a central block of the cube blocks. An end of the elastic member abuts against a head of the adjusting screw, and the other end of the elastic member abuts against the center block. By rotating the adjusting screw, a compression amount of the elastic member can be adjusted, and thus a tightness of the smart magic cube can be adjusted. Alternatively, the adjusting screw is connected to an intermediate connecting block. An end of the elastic member abuts against a head of the adjusting screw, and the other end of the elastic member abuts against the intermediate connecting block. By rotating the adjusting screw, the compression amount of the elastic member can be adjusted, and thus the tightness of the smart magic cube can be adjusted.

A timing method for a smart magic cube includes:
  obtaining a rotation signal of a cube layer and starting timing by a main control module, when a rotor starts to be rotated relative to a stator;
  calculating a real-time status of the smart magic cube according to the rotation signal of each cube layer, by the main control module;
  determining whether the real-time status of the smart magic cube is a restoration status of the smart magic cube;
  if being so, terminating timing by the main control module; and if being not, continuing to calculate the real-time status of the smart magic cube by the main control module.

Through the above timing method of the smart magic cube, it is possible to obtain a time spent by a player when the player turns the smart magic cube to the restoration status thereof, thereby realizing the competition between different players or the player's self-training.

REFERENCE NUMBERS

Figure 1:
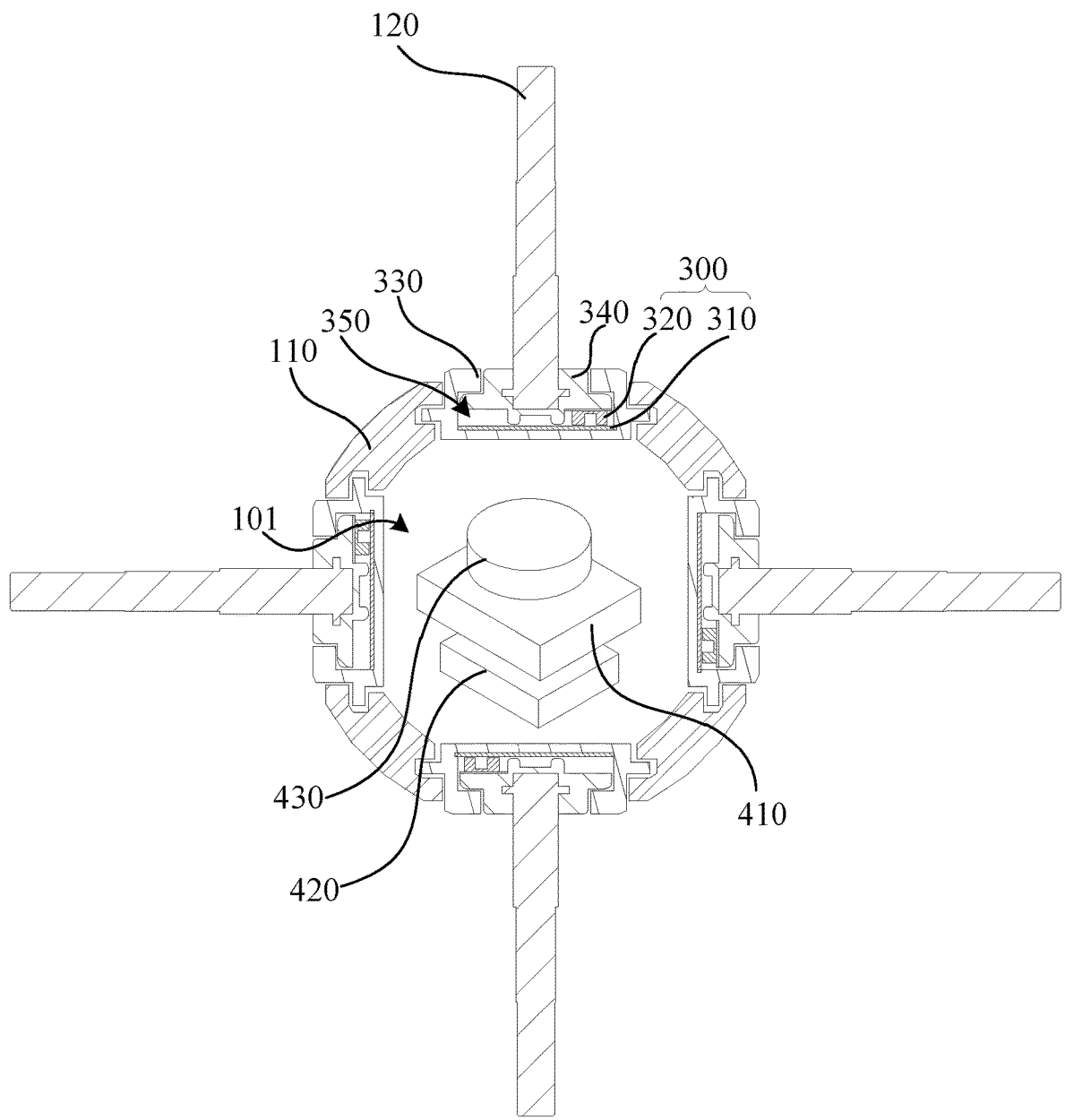
FIG. 1 is a cross-sectional view of a smart center shaft according to an embodiment of the present disclosure.

101—cavity, 110—housing, 111—shaft sleeve, 112—protrusion, 113—liding groove, 114—threaded hole, 115—arc-shaped housing piece, 116—plug-in box, 117—engaging slot, 120—connecting rod, 121—elastic member, 200—cube block, 210—center block, 211—slot, 220—edge block, 230—corner block, 300—sensor, 310—stator, 311—common signal ring, 312—angle signal ring, 320—rotor, 321—first electric contact pin, 322—second contact pin, 330—first mounting block, 340—second mounting block, 350—receiving cavity, 360—connecting housing, 361—rotating flange, 362—second connecting sleeve, 410—main control module, 420—power module, 430—buzzer, 510—intermediate connecting block, 511—first connecting sleeve, 520—sliding block, 530—mounting base, 531—screw.

DETAILED DESCRIPTION

In order to facilitate the understanding of the present disclosure, the present disclosure will be described more fully below with reference to the relevant drawings. Preferred embodiments of the present disclosure are shown in the drawings. However, the present disclosure can be implemented in many different forms and is not limited to the embodiments described herein. On the contrary, the purpose of providing these embodiments is to have a more thorough and comprehensive understanding of the disclosure of the present disclosure.

It should be noted that when an element is referred to as being "fixed on" another element, it can be directly on another element or intervening elements may be present therebetween. When an element is referred to as being "connected" to another element, it can be directly connected to the other element or intervening elements may be present therebetween. On the contrary, when an element is referred to as being "directly on" another element, there are no intervening elements. Terms "vertical", "horizontal", "left", "right" and similar expressions used herein are for illustrative purposes only. Terms "first" and "second" in the present disclosure do not represent a specific number and order, but are only used to distinguish names.

First Embodiment

As shown in FIG. 1, a smart center shaft includes a core, a sensor 300 and a main control module 410. The core includes a housing 110 with a cavity 101. The sensor 300 is mounted on the core. The sensor 300 includes a stator 310 and a rotor 320. The stator 310 is fixed to the housing 110. When the smart center shaft is applied to the smart magic cube, a cube layer of the smart magic cube is rotated relative to the housing 110, and the rotor 320 is configured to be able to be connected to and synchronously rotated with the cube layer of the smart magic cube, so that the rotor 320 can be rotated relative to the stator 310 following the cube layer. The main control module 410 is mounted in the cavity 101. The main control module 410 is electrically connected to the sensor 300. The main control module 410 obtains a rotation signal of the cube layer according to the relative rotation between the rotor 320 and the stator 310.

In the above-mentioned smart central shaft, the sensor 300 and the core form a whole, which is highly integrated, and avoids considering a complicated assembly relationship between the stator 310 and a central block 210 or an intermediate connecting block 510. The smart center shaft can be provided as an independent module, which facilitates an assembly of the smart magic cube and greatly simplifies an assembly process of the smart magic cube. In addition, the sensor 300 is mainly mounted in the housing 110. The sensor has low requirements for a size of a cube block (such as center block, corner block, and edge block), so that the size and specifications of the cube block can be designed according to actual needs. The smart magic cube has a large redundancy in design space, so that the fault-tolerant performance is improved, and the user' hand feeling is effectively improved. When applied to a smart magic cube, the main control module 410 obtains a rotation signal of the cube layer according to the relative rotation between the rotor 320 and the stator 310, and then obtains a status signal of the smart magic cube according to the rotation signal of each cube layer. Therefore, when applied, the smart center shaft is highly intelligent, and can realize networked online competitions for users.

Figure 6:
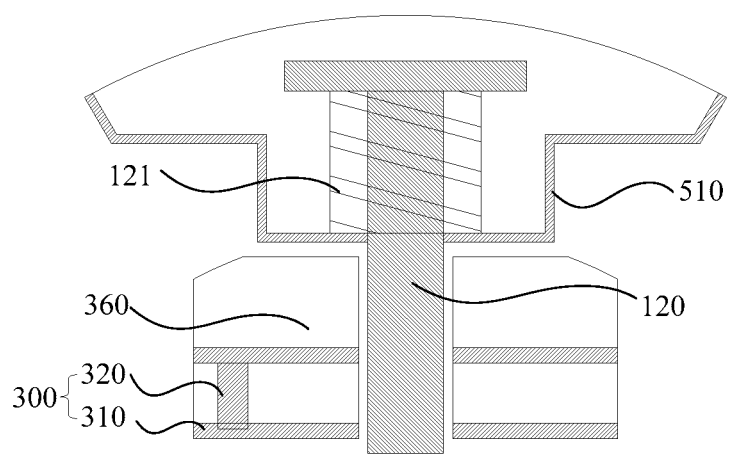
FIG. 6 is a mounting schematic view of a sensor in the smart magic cube of FIG. 4.
Figure 10:
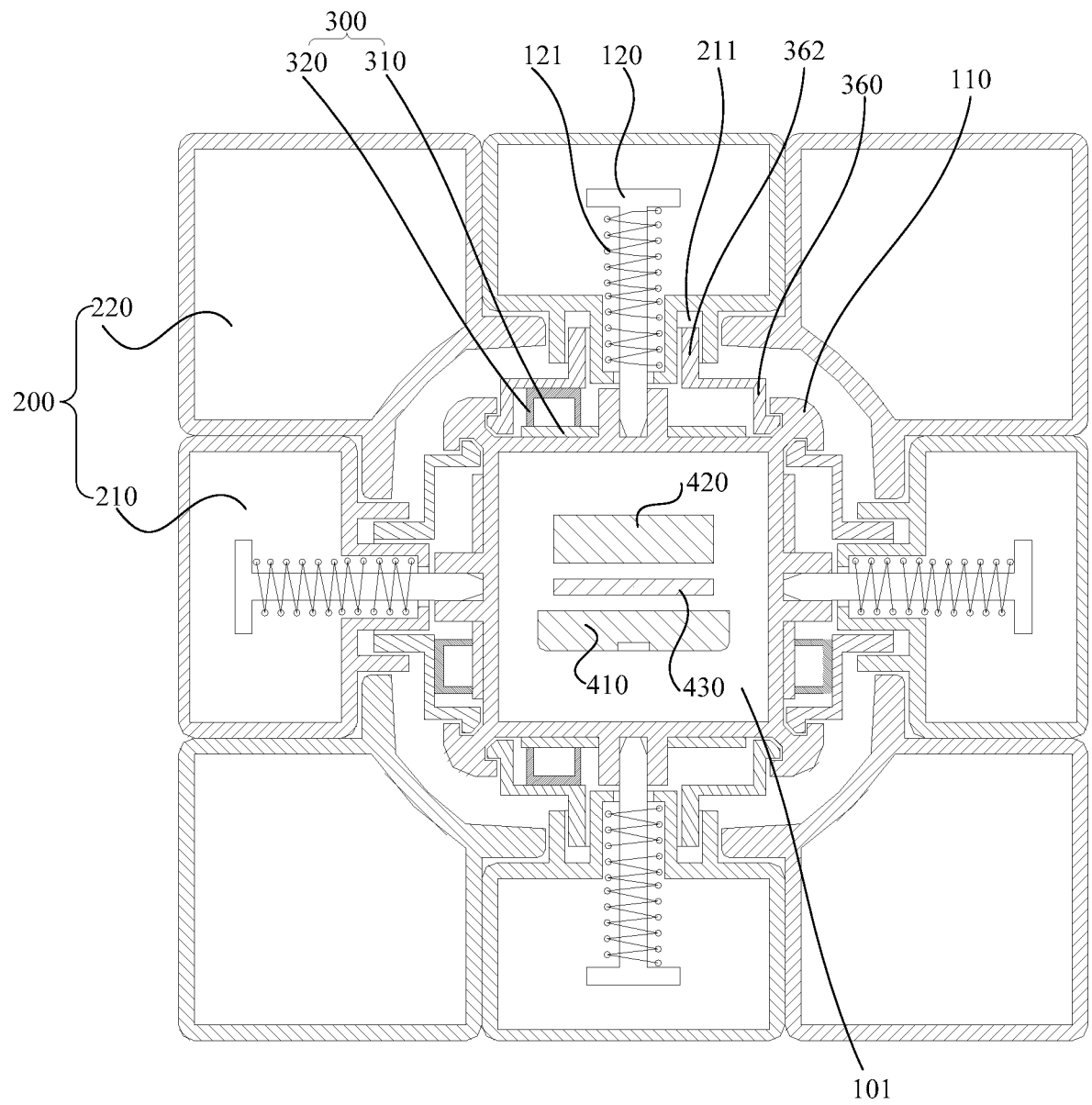
FIG. 10 is an inner structural schematic view of a smart magic cube when being a third-order magic cube according to the present disclosure.

It should be noted that a cube block 200 includes one or more of a center block 210, an edge block 220, and a corner block 230. For example, referring to FIG. 10, a third-order magic cube has the center block 210, the edge block 220 and the corner block 230. Of course, some magic cubes do not necessarily have the center block 210 and the edge block 220, such as a second-order magic cube (referring to FIG. 7). The rotor 320 can directly or indirectly be rotated with the cube layer of the smart magic cube synchronously. For example, as shown in FIG. 1, a plurality of connecting rods 120 is disposed at intervals on the core. The connecting rods 120 are rotated synchronously with the cube layers. The rotor 320 is fixedly connected to the connecting rods 120, so as to realize the synchronous rotation of the rotor 320 and the cube layers. For another example, the rotor 320 is fixedly connected to an intermediate connecting block 510 (as shown in FIG. 6) or the central block 210 (as shown in FIG. 10) through a connecting housing 360, so that the rotor 320 can be rotated with the cube layers synchronously.

Figure 3:
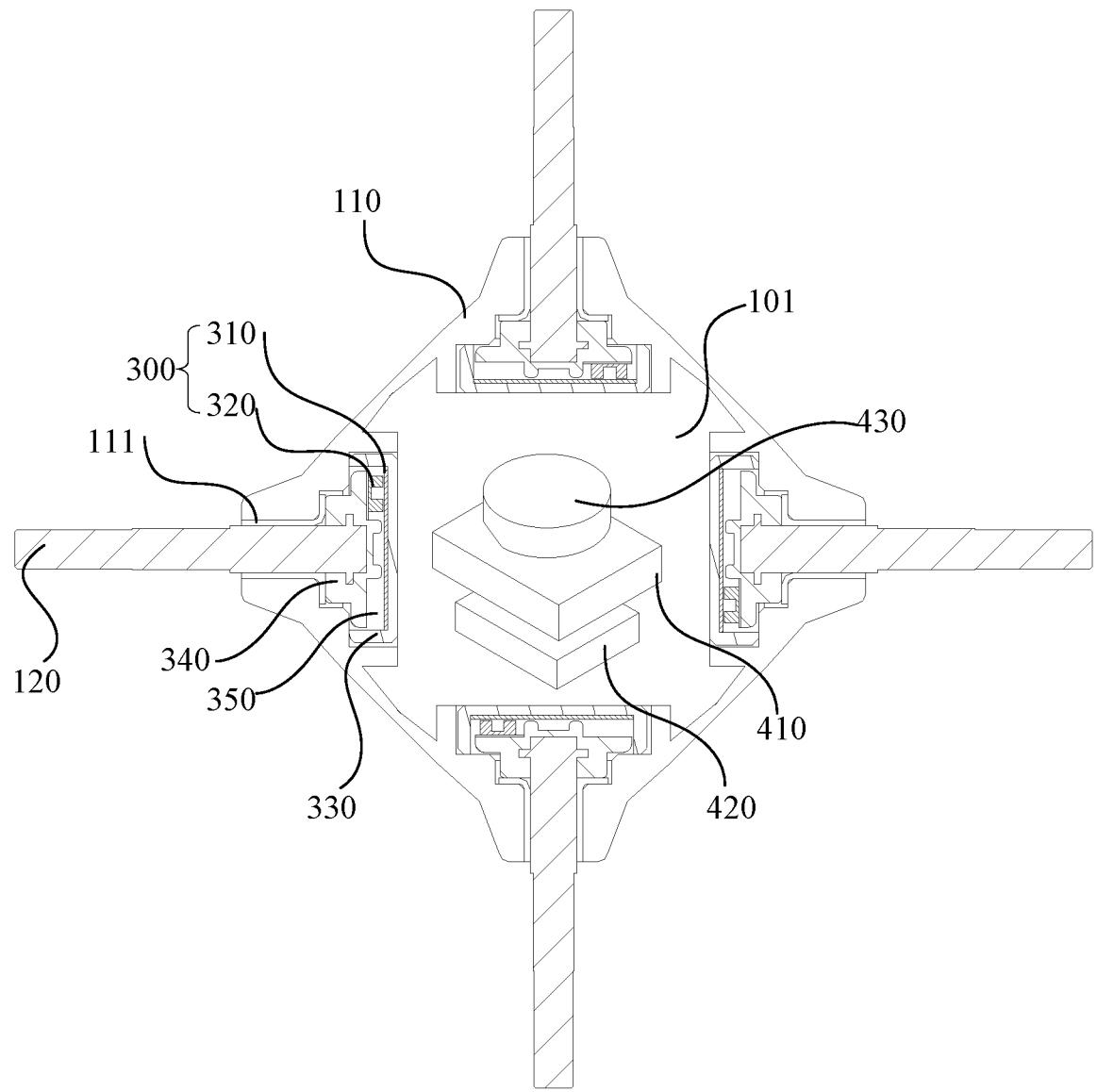
FIG. 3 is a cross-sectional view of the smart center shaft shown in FIG. 2.

In addition, when the sensor 300 is electrically connected to the main control module 410 in the housing 110 through a cable, since the sensor 300 is directly mounted on the housing 110 and is close to the main control module 410 in the housing 110, it is not necessary to wire in the connecting rod 120, which is convenient for wiring. In addition, the connecting rod 120 is not necessarily a tubular shaft, and the connecting rod 120 can be selected as a solid rod for easy manufacturing and processing. Optionally, the stator 310 can be fixed on a side wall of the housing 110 (as shown in FIG. 1), inside the housing 110 (as shown in FIG. 3), or on an outer surface of the housing 110 (as shown in FIG. 10).

In this embodiment, the main control module 410 includes a processing unit, a control unit, and a communication unit. The processing unit is used to convert the rotation signal of the cube layers to the status signal of the smart magic cube. Specifically, according to the rotation signal of each cube layer, the status of each cube layer before and after being rotated can be obtained, and then the status signal of the entire smart magic cube can be obtained. The control unit is electrically connected to the processing unit and the communication unit, respectively. The communication unit is used for data transmission between the control unit and peripheral devices, so as to realize networked communication, networked teaching, networked training, or networked competitions, and can specifically realize real-time synchronous control, electronic blind twist, timing, restoration step reproduction, shortest restoration route prompt, statistics function of a virtual cube. It can be understood that in other embodiments, the main control module 410 can convert the rotation signal of the cube layers to the status signal of the smart magic cube by means of a processing device of peripheral device. The processing device of peripheral device can then transmit the status signal of the smart magic cube back to the main control module 410. Thereby, a volume of the main control module 410 is reduced, and the space occupied by the main control module 410 in the cavity 101 is reduced.

Specifically, referring to FIG. 1, a power module 420 and a buzzer 430 electrically connected to the main control module 410 are further mounted in the cavity 101. The power module 420 is used to provide power to the main control module 410. The buzzer 430 can increase the interaction between the magic cube and the player, such as issuing an alarm sound, a prompt sound, or a start sound.

Figure 7:
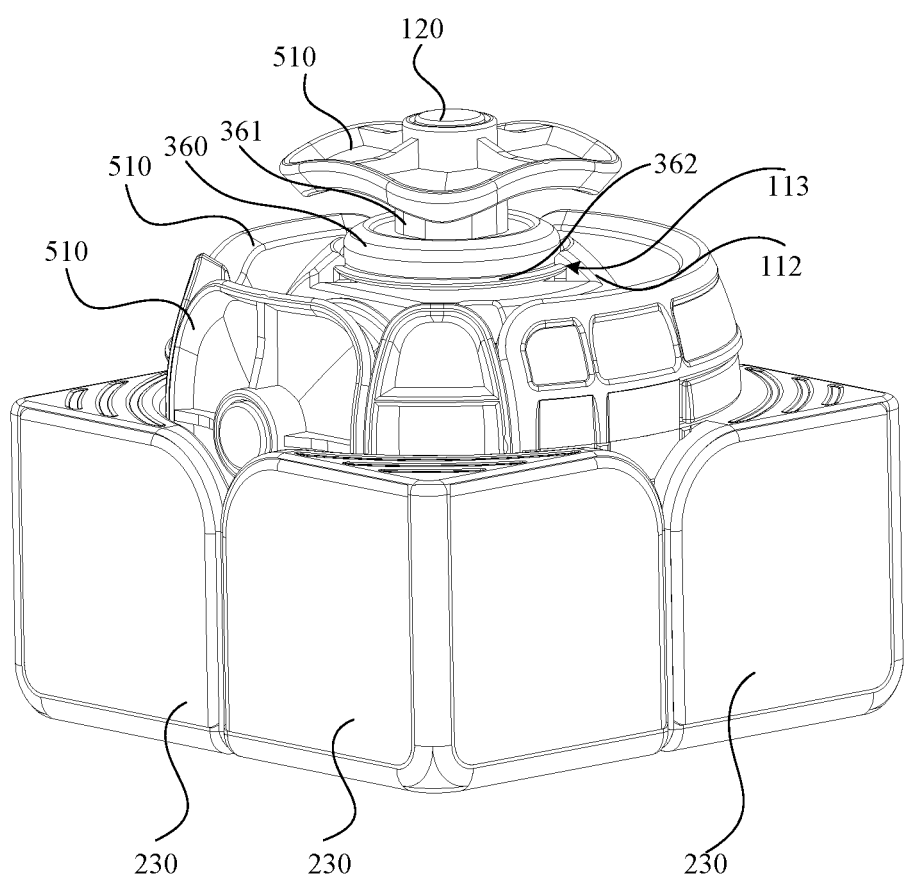
FIG. 7 is an inner structural view of the smart magic cube of FIG. 4.
Figure 8:
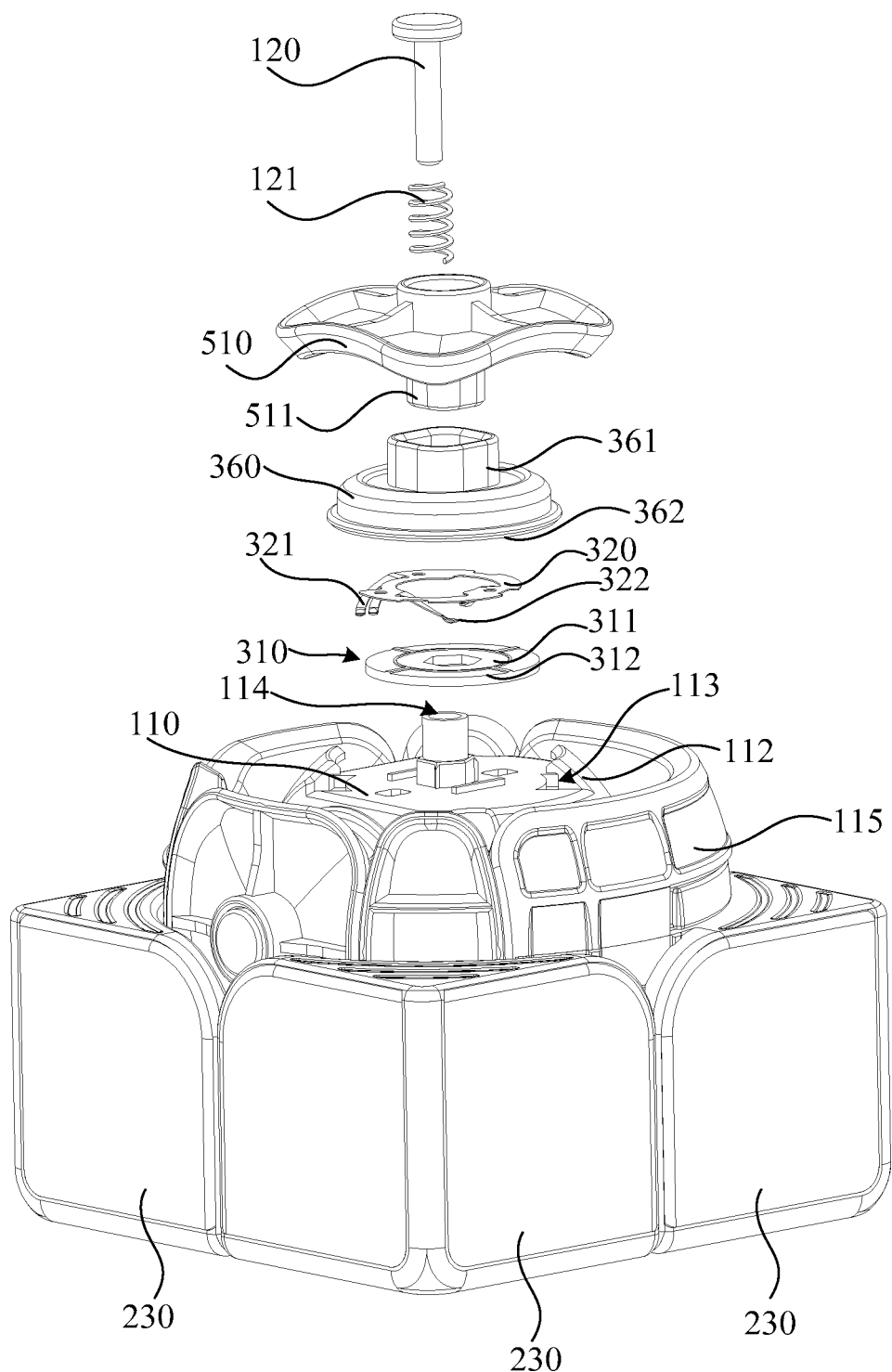
FIG. 8 is an exploded view of the smart magic cube shown in FIG. 7.

In this embodiment, the rotor 320 and the stator 310 are rotatably connected. Referring to FIGS. 6 to 8, the stator 310 includes a common signal ring 311 and an angle signal ring 312 that is coaxial with and insulated from the common signal ring 311. The rotor 320 is a conductive member. The conductive member includes a first contact pin 321 and a second contact pin 322. The first electric contact pin 321 is used to be in contact with the common signal ring 311. The second electric contact pin 322 is used to be in contact with different positions of the angle signal ring 312 when the cube layer is rotated, so as to obtain the rotation signal of the cube layer. When the cube layer is rotated, the first electric contact pin 321 is always pressed against the common signal ring 311 and maintains relative sliding contact with the common signal ring 311. The rotor 320 is rotated with the cube layer, and the position of the conductive member on the rotor 320 is changed, and thus the connection relationship between the common signal ring 311 and the angle signal ring 312 of the sensor 300 is changed. Therefore, different signals can be generated, so that the main control module 410 can sense the rotation signal of the cube layer.

It can be understood that there are many ways for the sensor 300 to obtain the rotation signal of the cube layer through the relative rotation between the rotor 320 and the stator 310. In other embodiments, the sensor 300 may be a resistive potentiometer, a miniature encoder, a photoelectric sensing structure, or an electromagnetic sensing structure. For example, the rotor includes a plurality of magnets. The magnetic field intensity of each magnet is different from each other. The stator is a Hall sensor. When the cube layer is rotated, the Hall sensor passes through different magnets, which generates different voltages. The rotation signal of the cube layer can be obtained according to the different voltages. For another example, the rotor includes a light source and a baffle mounted below the light source. The baffle is provided with a notch. The stator is a plurality of light receivers. When the baffle is rotated with the cube layer, the notch is rotated to align with different light receivers, so that the light receivers can receive the light from the light source and the rotation signal of the cube layer can be obtained.

Second Embodiment

The second embodiment illustrates a specific solution for the rotor 320 to be rotated synchronously with the cube layer through the connecting rod 120.

Figure 2:
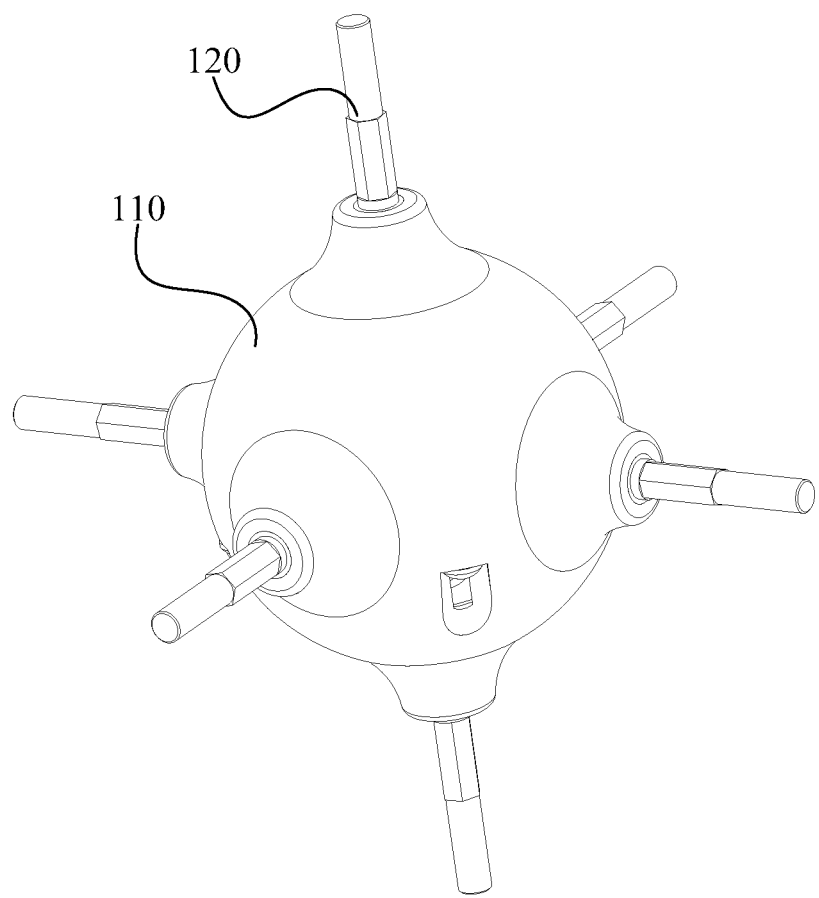
FIG. 2 is a structural schematic view of a smart center shaft according to another embodiment of the present disclosure.

As shown in FIG. 2 and FIG. 3, the smart center shaft further includes the connecting rod 120. The rotor 320 is rotatably mounted on the housing 110. The connecting rod 120 is fixedly connected to the rotor 320. A center block or an intermediate connecting block is fixedly mounted on the connecting rod 120, so that the connecting rod 120 is rotated synchronously with the rotation of the cube layer. Therefore, after the connecting rod 120 is fixedly connected to the rotor 320, the rotor 320 can be rotated with the cube layer synchronously.

Specifically, referring to FIG. 3, the sensor 300 is located in the housing 110. The housing 110 is provided with a through hole. The connecting rod 120 is connected to the rotor 320 after passing through the through hole. The sensor 300 is entirely located in the housing 110, which is beneficial to protect the sensor 300 and prevents the sensor 300 from being impacted or interfered by the cube block 200 or other structural components when the magic cube is rotated. In addition, the sensor 300 and the core form a tighter whole. The smart center shaft has a higher degree of integration and is easier to be compatible and assembled with the cube block 200.

Furthermore, referring to FIG. 3, a shaft sleeve 111 may be mounted in the through hole of the housing 110. The shaft sleeve 111 is located between the connecting rod 120 and a side wall of the housing 110. The shaft sleeve 111 can fit the through hole tightly, so that the connecting rod 120 can be rotated stably. The connecting rod 120 is a metal rod, and the shaft sleeve 111 is a metal shaft sleeve. Since the machining accuracy of the metal parts is high and controllable, a friction force between the metal shaft sleeve and the metal rod is controllable and stable, which can ensure that the friction force received by each metal rod is consistent, and which is beneficial to improve the player's hand feeling.

Specifically, referring to FIG. 3, the sensor 300 further includes a first mounting block 330 fixedly mounted on the housing 110 and a second mounting block 340 rotatably mounted on the housing 110. The stator 310 is fixed to the first mounting block 330, and the rotor 320 is fixed to the second mounting block 340. A receiving cavity 350 is formed between the first mounting block 330 and the second mounting block 340. The stator 310 and the rotor 320 are located in the receiving cavity 350, which facilitates a good rotational fit between the stator 310 and the rotor 320. The design of the receiving cavity 350 can avoid the interference of the main control module 410 and other components inside the housing 110 to the sensor 300, in order to accurately obtain the rotation signal of the cube layer.

Specifically, the housing 110 may include an upper hosing and a lower housing that are connected to each other. Optionally, the upper hosing and the lower hosing can be detachably connected by a screw.

Third Embodiment

The third embodiment illustrates the specific solution that the rotor 320 is connected to the central block 210 or the intermediate connecting block 510 through the connecting housing 360 to be rotated synchronously with the cube layer.

The sensor 300 further includes the connecting housing 360. The connecting housing 360 is rotatably mounted on the housing 110 and is fixedly connected to the central block 210 (referring to FIG. 10) or the intermediate connecting block 510 (referring to FIGS. 4 to 8). Referring to FIG. 10, a bottom of the center block 210 is provided with a slot 211. The connecting housing 360 is clamped into the slot to be fixedly connected with the center block 210. The rotor 320 is fixed to the connecting housing 360. The central block 210 or the intermediate connecting block 510 can be rotated synchronously with the cube layer, so that the connecting housing 360 and the rotor 320 can be rotated synchronously with the cube layer.

Specifically, referring to FIG. 6 and FIG. 7, the rotor 320 is fixed on an inner side of the connecting housing 360, the stator 310 is fixed on the outer surface of the housing 110, and the connecting housing 360 covers the rotor 310. Thus, the connecting housing 360 can protect the rotor 320 and the stator 310 at the same time to prevent the sensor 300 from being interfered by the environment or other components, especially in the smart magic cube with small internal space, many components, and the components constantly rotating during use, which is beneficial to improve the accuracy and stability of the detection of the sensor 300.

Figure 5:
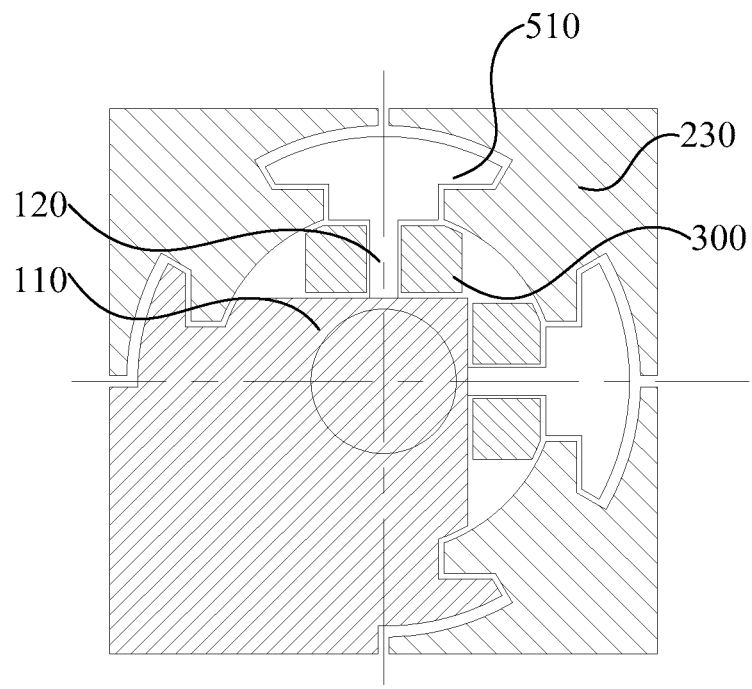
FIG. 5 is an inner structural schematic view of the smart magic cube of FIG. 4.

In addition, referring to FIG. 5 with other figures, the sensor 300 is located between a shaft center and the intermediate connecting block 510, instead of being disposed inside the intermediate connecting block 510 or inside the shaft center, so that the sensor 300 as a whole can remain relatively independent without too much consideration of the assembly relationship with the structural components inside the intermediate connecting block 510 or the structural components inside the shaft center. In this way, the sensor 300 can be assembled modularly, which is relatively independent and has good compatibility.

Specifically, referring to FIGS. 7 and 8, a peripheral edge of the connecting housing 360 is provided with a rotating flange 361, the outer surface of the housing 110 is provided with a protrusion 112. The protrusion 112 is provided with a sliding groove 113 that cooperates with the rotating flange 361. Therefore, the connecting housing 360 can be rotatably disposed on the housing 110. During the rotation of the connecting housing 360 and the rotor 320, the sliding groove 113 can limit the connecting housing 360, which can ensure the smooth rotation of the connecting housing 360 and the rotor 320.

Further, referring to FIGS. 7 and 8, the intermediate connecting block 510 is provided with a first connecting sleeve 511 rotatably sleeved on the connecting rod 120. It should be noted that, compared with the second embodiment (in which the connecting rod is rotated synchronously with the cube layer), the connecting rod 120 in the third embodiment is fixed on the housing 110 or the stator 310, and cannot be rotated. The rotor 320 is mounted at the inner side of the connecting housing 360. The connecting housing 360 is provided with a second connecting sleeve 362 extending toward the first connecting sleeve 511. The second connecting sleeve 362 is sleeved with the first connecting sleeve 511 to improve the stability of the connection between the connecting housing 360 and the intermediate connecting block 510. Compared with bonding or threaded connection, the connecting housing 360 adopts a sleeved connection to be rotated synchronously with the intermediate connecting block 510, which facilitates quick assembly between the connecting housing 360 and the intermediate connecting block 510. It can be understood that an outer contour of the first connecting sleeve 511 can be elliptical, polygonal, or irregular. After the second connecting sleeve 362 is sleeved on the first connecting sleeve 511, the connecting housing 360 can be rotated synchronously with the intermediate connecting block 510, and cannot be rotated relative to the intermediate connecting block 510.

Fourth Embodiment

Figure 4:
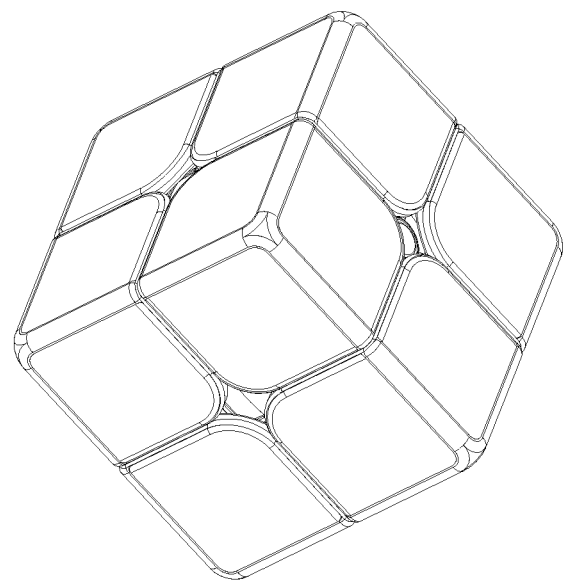
FIG. 4 is a perspective view of a smart magic cube when being a second-order magic cube according to the present disclosure.

Referring to FIGS. 4 and 10, a smart magic cube includes a plurality of cube blocks 200 and any one of the above-mentioned smart central shafts. The plurality of cube blocks 200 is mounted on the smart central shaft. The plurality of cube blocks 200 forms a plurality of cube layers. The rotor 320 is connected to the cube layers. The smart magic cube can obtain the rotation signal and status signal of the smart magic cube by means of the main control module 410, which can realize intelligence, and can realize an online magic cube competition.

Specifically, the smart magic cube further includes an elastic member 121. The elastic member 121 may be a spring or an elastic pad. The smart central shaft further includes the plurality of connecting rods 120, which are distributed on the core at intervals. The connecting rods 120 are adjusting screws. The housing 110 is provided with a threaded hole 114, in which the adjusting screw can be mounted.

In one embodiment, referring to FIG. 10, the adjusting screw is connected to the central block 210 of the cube blocks 200. An end of the elastic member 121 abuts against a head of the adjusting screw, and the other end of the elastic member 121 abuts against the center block 210. By rotating the adjusting screw, the compression amount of the elastic member 121 can be adjusted, and thus the tightness of the smart magic cube can be adjusted.

In another embodiment, referring to FIG. 6, the adjusting screw is connected to the intermediate connecting block 510. An end of the elastic member 121 abuts against the head of the adjusting screw, and the other end the elastic member 121 abuts against the intermediate connecting block 510. By rotating the adjusting screw, the compression amount of the elastic member 121 can be adjusted, and thus the tightness of the smart magic cube can be adjusted.

The smart magic cube can be a second-order magic cube (as shown in FIG. 4 to FIG. 8), a third-order magic cube (as shown in FIG. 10), or a high-order magic cube. The third-order magic cube includes a third-order pyramid magic cube. The higher-order magic cube includes a higher-order pyramid magic cube.

In addition, as shown in FIGS. 4 to 8, the second-order magic cube includes three intermediate connecting blocks 510, eight corner blocks 230, nine sliding blocks 520, and seven mounting bases 530. The three intermediate connecting blocks 510 are respectively mounted on the three connecting rods 120. The sliding blocks 520 are clamped on four sides of the intermediate connecting block 510. That is, one intermediate connecting block 510 is adjacent to the four sliding blocks 520. The mounting base 530 is clamped between the sliding blocks 520. The shaft center is provided with an arc-shaped housing piece 115. The arc-shaped housing piece 115, the three intermediate connecting blocks 510, the nine sliding blocks 520 and the seven mounting bases 530 together form a spherical surface. The eight corner blocks 230 include seven moving blocks and one fixed block. The moving blocks are mounted on the mounting base 530 in a one-to-one correspondence. For example, the mounting base 530 is provided with screws 531 for connecting the moving block. The fixing block is fixedly disposed on the arc-shaped housing piece 115. For example, the fixing block may be bonded to the arc-shaped housing piece 115. Alternatively, the fixing block and the arc-shaped housing piece 115 may be integrally formed. The moving block can slide on the spherical surface. When the player rotates the moving block, the moving block drives the mounting base 530, and then the mounting base 530 pushes the sliding block 520 and the intermediate connecting block 510 to rotate around an axis of the adjacent connecting rod 120.

The conventional second-order magic cube includes six intermediate connecting blocks 510, twelve sliding blocks 520, and eight mounting bases 530. Six center blocks 210, twelve sliding blocks 520 and eight mounting bases 530 together form the spherical surface. In this embodiment, three intermediate connecting blocks 510, nine sliding blocks 520, seven mounting bases 530, and arc-shaped housing piece 115 together form the spherical surface. Thereby, it can be known that an outer surface of the arc-shaped housing piece 115 occupies the positions of the original three intermediate connecting blocks 510, three sliding blocks 520 and one mounting base 530. That is, the outer surface of the arc-shaped housing piece 115 of the shaft center occupies the areas of the three intermediate connecting blocks 510, the three sliding blocks 520 and the one mounting base 530. In this way, the number of connecting rods 120, intermediate connecting blocks 510, sliding blocks 520, and mounting bases 530 is reduced, which can reduce the occupation of the internal space of the smart magic cube. Correspondingly, the space saved is used for a shaft center with an increased size. The large-sized shaft center, on the one hand, can facilitate processing and assembly, and on the other hand, can improve the stability of the connection between other structural components and the shaft center, thereby improving the use stability of the smart magic cube. For example, when the size of the shaft center is increased, the contact area between the moving block and the shaft center can be increased. Thus, the connection is more stable, and the moving block is not easy to thrown out, during the use of the smart magic cube. For another example, when the size of the shaft center is increased, the inside of the shaft center can accommodate a main control module 410 with a larger size, or receive more components such as one or more of a power supply with a larger size and larger capacity, a geomagnetic sensor, a gyroscope, a vibration sensor, and a shock-absorbing motor. Therefore, the smart magic cube has more functions and can be smarter.

Figure 9:
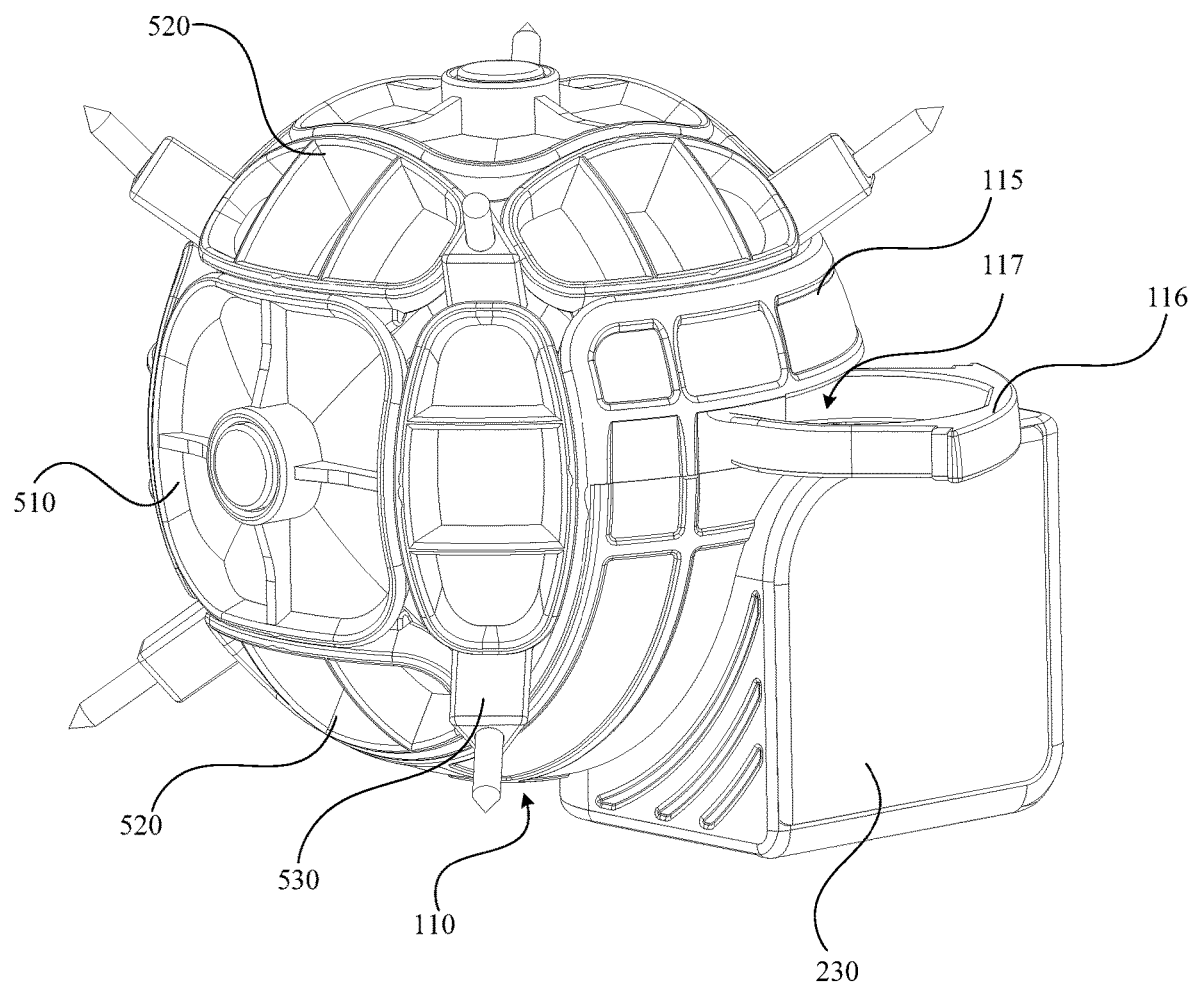
FIG. 9 is a structural schematic view of the smart magic cube of FIG. 7 with three corner blocks removed.

Further, referring to FIG. 9, the smart magic cube also includes a plug-in box 116 on which a power source is mounted. The arc-shaped housing piece 115 is provided with an engaging slot 117 that matches the plug-in box 116. In this way, the plug-in box 116 is detachably mounted on the shaft center, which is convenient for subsequent replacement of the power supply.

Fifth Embodiment

Figure 11:
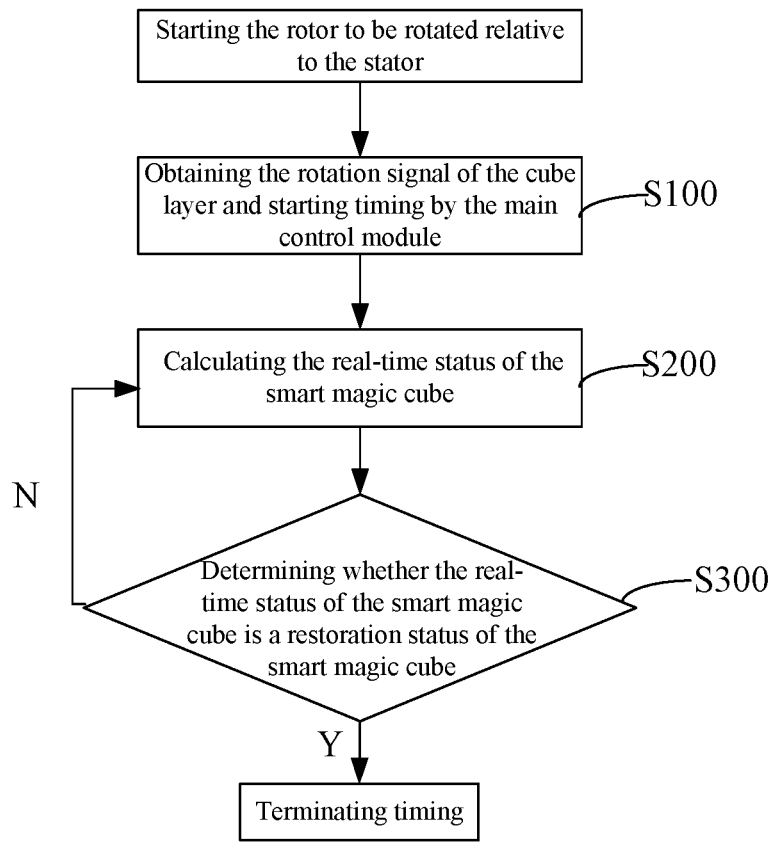
FIG. 11 is a schematic view of a flowchart of a timing method of a smart magic cube according to the present disclosure.

Referring to FIG. 1 and FIG. 11, a timing method for a smart magic cube includes the following steps of S100 to S400.

In S100, when the rotor starts to be rotated relative to the stator, the main control module obtains the rotation signal of the cube layer and starts timing.

In S200, the main control module calculates the real-time status of the smart magic cube according to the rotation signal of each cube layer.

In S300, it is determined whether the real-time status of the smart magic cube is a restoration status of the smart magic cube.

In S400, if the real-time status of the smart magic cube is the restoration status of the smart magic cube, the main control module terminates timing; if the real-time status of the smart magic cube is not the restoration status of the smart magic cube, the main control module continues to calculate the real-time status of the smart magic cube.

Through the above timing method of the smart magic cube, it is possible to obtain the time spent by the player when the player turns the smart magic cube to the restoration status, that is, the time spent by the player from the start of the timing to the end of the timing of the main control module, which can realize the competition (the shortest period) between different players or the player's self-training.

Before step S100, a wake-up step is further included. The wake-up timing of the smart center shaft can be a moment when the player first touches the smart magic cube (for example, a touch sensor electrically connected to the main control module is provided on the surface of the cube), or a moment when the smart magic cube starts to move (for example, an acceleration sensor, gyroscope, or electromagnetic field sensor electrically connected to the main control module is mounted in the smart magic cube).

The technical features of the above-mentioned embodiments can be combined arbitrarily. In order to simply the description, all possible combinations of the technical features in the above-mentioned embodiments are not described. However, as long as there is no contradiction in the combinations of these technical features, they should be considered to be fallen into the range described in the present specification.

Only several embodiments of the present disclosure are illustrated in the above-mentioned embodiments, and the description thereof is relatively specific and detailed, but it should not be understood as a limitation on the scope of the present application. It should be noted that for those of ordinary skill in the art, without departing from the concept of the present disclosure, several modifications and improvements can be made, which all fall within the protection scope of the present disclosure. Therefore, the protection scope of the present application shall be subject to the appended claims.

What is claimed is:

1. A smart center shaft used in a smart magic cube, comprising:

a core comprising a housing with a cavity;

a sensor mounted on the core, and comprising a stator and a rotor, and the stator being fixed to the housing, the rotor being configured to be able to be connected to and rotated synchronously with a cube layer of the smart magic cube, so that the rotor is capable of being rotated relative to the stator following the cube layer;

a main control module mounted in the cavity, and the main control module being electrically connected to the sensor, the main control module obtaining a rotation signal of the cube layer according to a relative rotation between the rotor and the stator; and a connecting rod, wherein a center block or an intermediate connecting block is mounted on the connecting rod, the rotor is rotatably mounted on the housing, and the connecting rod is fixedly connected to the rotor;

wherein the sensor further comprises a first mounting block fixedly mounted on the housing and a second mounting block rotatably mounted on the housing; the stator is fixed to the first mounting block, and the rotor is fixed to the second mounting block; a receiving cavity is formed between the first mounting block and the second mounting block; the stator and the rotor are located in the receiving cavity.

2. The smart center shaft of claim 1, wherein the sensor is located in the housing, the housing is provided with a through hole, and the connecting rod is connected to the rotor after passing through the through hole.

3. The smart center shaft of claim 1, wherein the sensor further comprises a connecting housing rotatably mounted on the housing; the connecting housing is configured to be able to be fixedly connected to a central block or an intermediate connecting block; and the rotor is fixed to the connecting housing.

4. The smart center shaft of claim 3, wherein the rotor is fixed on an inner side of the connecting housing; the stator is fixed on an outer surface of the housing; and the connecting housing covers the rotor.

5. The smart center shaft of claim 4, wherein a peripheral edge of the connecting housing is provided with a rotating flange; an outer surface of the housing is provided with a protrusion; and the protrusion is provided with a sliding groove that cooperates with the rotating flange.

6. The smart center shaft of claim 1, wherein the main control module comprises a processing unit, a control unit, and a communication unit; the processing unit is configured to convert the rotation signal of the cube layer into a status signal of the smart magic cube; the control unit is electrically connected to the processing unit and the communication unit, respectively; and the communication unit is configured for data transmission between the control unit and peripheral devices.

7. A smart magic cube, comprising a plurality of cube blocks and the smart center shaft of claim 1, wherein the plurality of cube blocks is mounted on the smart center shaft; the plurality of cube blocks forms a plurality of cube layers; and the rotor is connected to the cube layers.

8. The smart magic cube of claim 7, wherein the smart magic cube is a second-order magic cube, a third-order magic cube, or a high-order magic cube.

9. The smart magic cube of claim 7, wherein the main control module:

obtains the rotation signal of the cube layer and starts timing by the main control module, when the rotor starts to be rotated relative to the stator;

calculates a real-time status of the smart magic cube according to the rotation signal of each cube layer, by the main control module;

determines whether the real-time status of the smart magic cube is a restoration status of the smart magic cube;

if it is, terminates timing by the main control module; and if it is not, continues to calculate the real-time status of the smart magic cube by the main control module.

10. A smart center shaft used in a smart magic cube, comprising:

a core comprising a housing with a cavity;

a sensor mounted on the core, and comprising a stator and a rotor, and the stator being fixed to the housing, the rotor being configured to be able to be connected to and rotated synchronously with a cube layer of the smart magic cube, so that the rotor is capable of being rotated relative to the stator following the cube layer; and a main control module mounted in the cavity, and the main control module being electrically connected to the sensor, the main control module obtaining a rotation signal of the cube layer according to a relative rotation between the rotor and the stator;

wherein the stator comprises a common signal ring and an angle signal ring that is coaxial with and insulated from the common signal ring; the rotor is a conductive member; the conductive member comprises a first contact pin and a second contact pin; the first electric contact pin is configured to be in contact with the common signal ring; the second electric contact pin is used to be in contact with different positions of the angle signal ring when the cube layer is rotated.

11. A smart magic cube, comprising:

a plurality of cube blocks;

a smart center shaft;

wherein the smart center shaft comprises:

a core comprising a housing with a cavity;

a sensor mounted on the core, and comprising a stator and a rotor, and the stator being fixed to the housing, the rotor being configured to be able to be connected to and rotated synchronously with a cube layer of the smart magic cube, so that the rotor is capable of being rotated relative to the stator following the cube layer; and a main control module mounted in the cavity, and the main control module being electrically connected to the sensor, the main control module obtaining a rotation signal of the cube layer according to a relative rotation between the rotor and the stator;

wherein the plurality of cube blocks is mounted on the smart central shaft; the plurality of cube blocks forms a plurality of cube layers; the rotor is connected to the cube layers; the smart magic cube further comprises an elastic member; the smart central shaft further comprises a plurality of connecting rods distributed on the core at intervals; the connecting rods are adjusting screws;

wherein the adjusting screw is connected to a central block of the cube blocks; an end of the elastic member abuts against a head of the adjusting screw, and the other end of the elastic member abuts against the center block; or the adjusting screw is connected to an intermediate connecting block; an end of the elastic member abuts against a head of the adjusting screw, and the other end of the elastic member abuts against the intermediate connecting block.

\* \* \* \* \*